Figure 1:
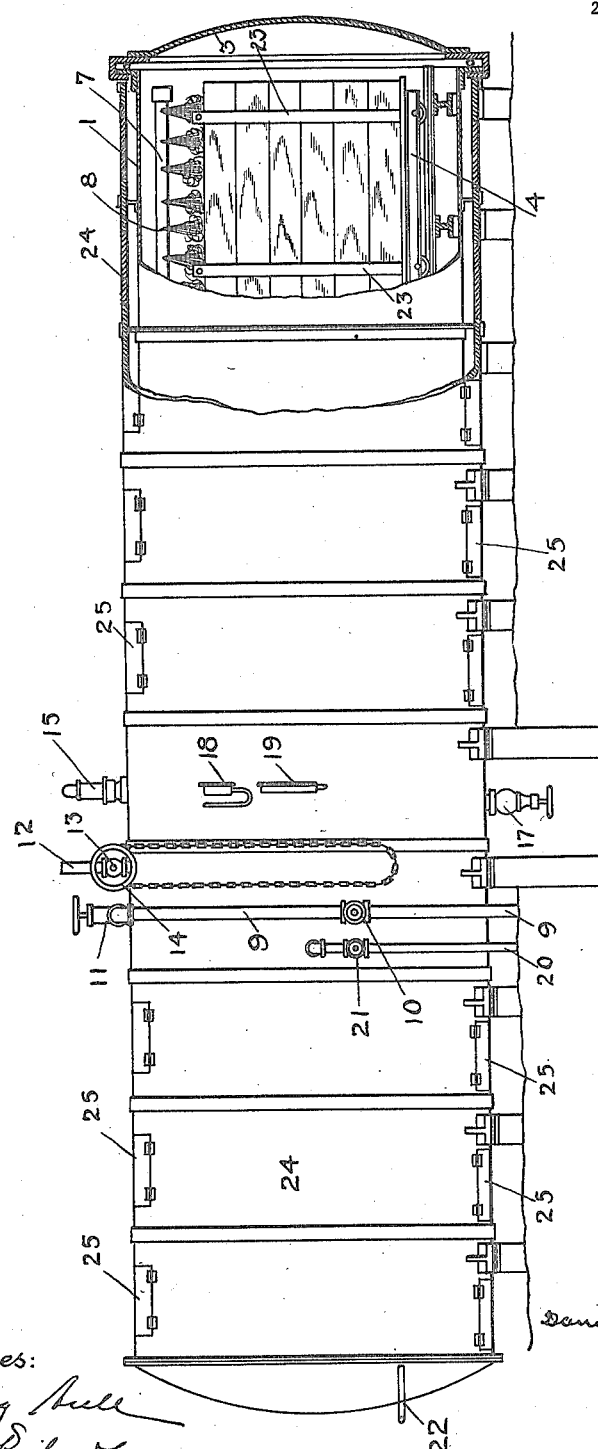

D. B. BANKS.
PROCESS OF DRYING AND EXTRACTING.
APPLICATION FILED APR. 19, 1915.

1,197,097.

Patented Sept. 5, 1916.
2 SHEETS—SHEET 2.

Witnesses:
Ludwig Krell
John A. Richardson

Daniel B. Banks
Inventor:
By
William W. Varney
Attorney.

UNITED STATES PATENT OFFICE.

DANIEL B. BANKS, OF BALTIMORE, MARYLAND.

PROCESS OF DRYING AND EXTRACTING.

1,197,097.   Specification of Letters Patent.   Patented Sept. 5, 1916.

Application filed April 19, 1915. Serial No. 22,347.

*To all whom it may concern:*

Be it known that I, DANIEL B. BANKS, a citizen of the United States, residing in Baltimore city, in the State of Maryland, have invented certain new and useful Improvements in the Processes of Drying and Extracting, of which the following is a specification.

This invention relates to the process of extracting from wood or other cellular, fibrous, or porous substances, the fluids contained therein, or developed therein during the process, or substances in suspension or solution in said fluids, and has for its object (a) the drying and seasoning of the cellular, fibrous, or porous substances and a conglomerate mass of the same, and (b) the extraction and collection of the fluids contained therein or developed therein during the process or substances in suspension or solution in said fluids.

In the modern processes of collecting fluids in wood or other cellular, fibrous, or porous substances by distillation the entire amount of fluids in such substances is evaporated and consequently the supply of heat required is large. In my process a large portion of the fluid is forced out of the containing substances without evaporation with a consequent reduction of time and expense of the process, and in some cases with a recovery of substances not recovered by the evaporating process.

With the foregoing and other objects in view my invention consists of the novel treatment, combination and arrangement of processes herein described and demonstrated by the accompanying drawings, wherein is shown an apparatus capable of having my process practised therein, but it is understood that changes, variations and modifications can be resorted to which come within the scope of the claims hereunto appended.

My process consists in mingling wood or other cellular, fibrous, or porous substances with any substance which absorbs and radiates heat with relatively great rapidity, such as gravel or metal, hereinafter called heat absorbing material, and inclosing the commingled aggregate in a chamber wherein it can be raised to a high temperature under pressure in a saturated vapor. The pressure and temperature of the vapor are then lowered, but the saturated condition retained. The wood or other cellular, fibrous, or porous material cools more slowly, and this cooling is further retarded by the radiation from the heat absorbing material. The liquids within the wood or other cellular, fibrous, or porous substance are thus, at least some of them, at a temperature above their boiling point at the then existing pressure. Internal vaporization thereupon takes place, and the resulting internal pressure drives out of the wood, or other cellular, fibrous, or porous substance unvaporized liquid. Any other means of supplying additional heat to the wood or other cellular, fibrous, or porous substance, may be substituted for the heat absorbing medium used provided only that such means does not deprive the operator of control of the pressure and moisture content of the vapor within the chamber. For example, additional heat may be supplied by a steam radiator not discharging steam into the chamber. The process is most efficient when saturation is maintained as above set forth. Slight variations from saturation, however, are compensated by surface evaporation from the material treated. So long as this is not excessive no damage is done. The above process leaves the pores in an open and distended condition. All free liquid in the chamber is now withdrawn and dry heat applied until the temperature is brought to the proper point, either to evaporate any remaining liquids, or to produce desired chemical reactions, or to liquefy or volatilize other substances in the wood or other cellular, fibrous, or porous substances.

To more fully understand my process I will refer to the accompanying drawings in which—

Figure 2:
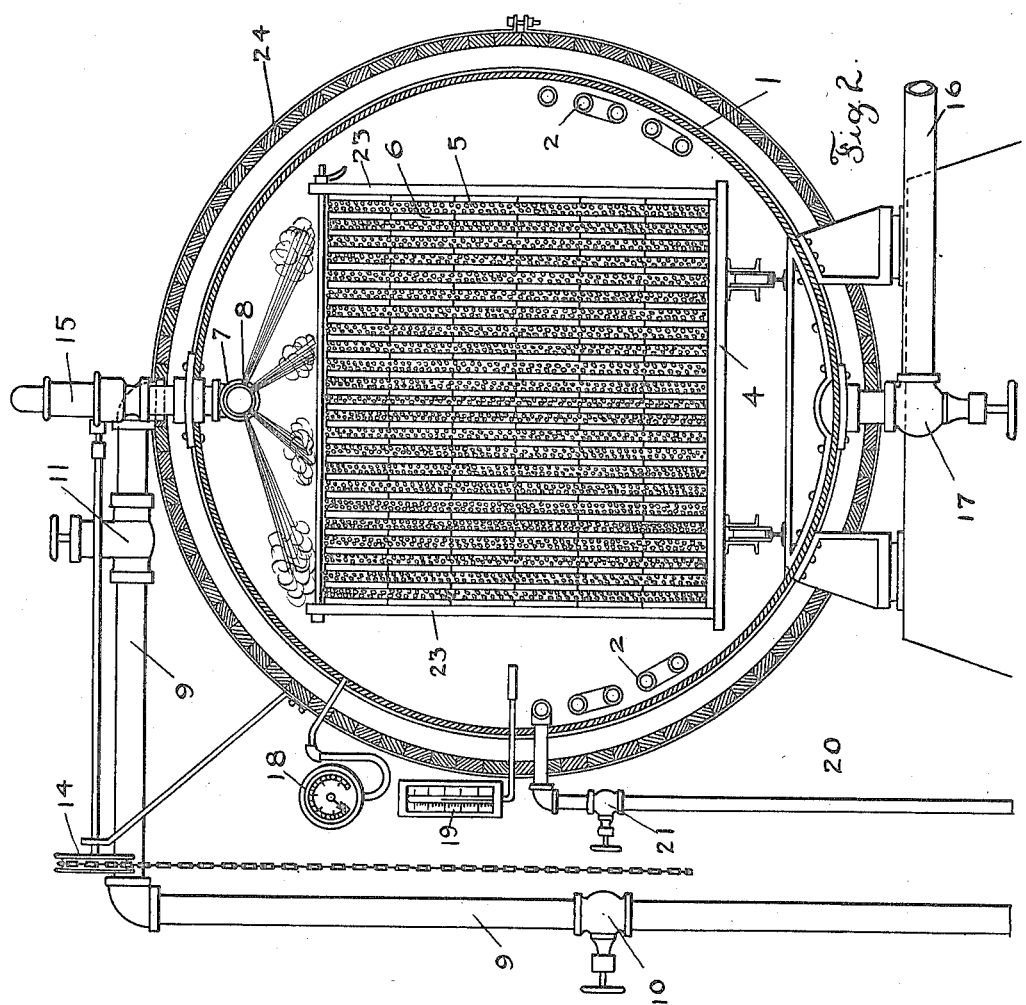

Figure 1 shows a longitudinal view partly in section of an extractor; Fig. 2 a transverse section of the same.

Similar numerals refer to similar parts throughout the several views.

1 is a shell of sufficient strength to withstand internal pressure and external pressures of such a range as practice may show to be necessary or advisable.

2 are pipes contained within the shell and are supplied with such heating or cooling fluids or gases as may be required.

3 is the door giving entrance to the extractor.

4 is a lumber buggy or car on which is stacked the lumber or substance to be dried or the substance from which extraction is to be made.

5 is the heat absorbing material such as gravel, broken stone or other substance preferably not affected by heat or fluids encountered in the drying or extracting process.

6 is lumber or substance to be dried or from which extraction is to be made.

7 is a steam or supply pipe.

8 are orifices or distributing vents in supply pipe 7, preferably arranged to direct the jets into the substance to be treated.

9 is an external pipe connected with supply pipe 7.

10 is a controlling valve in pipe 9.

11 is a regulating valve, preferably automatic, placed so as to control the pressure within shell 1.

12 is a blow-off orifice or pipe controlled by blow-off valve 13 operated by mechanism 14.

15 is a safety valve which may be set at any desired blow-off pressure.

16 is a drain controlled by drain valve 17.

18 is an absolute pressure gage for observing pressure within the shell.

19 is a thermometer for observing the temperature within shell 1.

Pipes 2 are connected to pipe 20 and are controlled by valve 21 at one end and exhaust through pipe 22.

23 are the clamps on the sides of buggy 4 between which sides the lumber, if lumber is to be dried, is stacked edgewise with the ordinary stickers vertically between the same.

24 is an outside insulating protector forming an air space between it and shell 1.

25 are trap doors or openings in the top and bottom of outside insulating protection 24.

The operation of my process is as follows: Lumber or any substance to be dried, or from which extraction is to be made, is placed in a suitable manner in the buggy 4 so that the gravel 5 or other heat absorbing material is mingled with the substance to be dried; in the case of lumber, the treatment of which I will now more fully describe as an illustration of my process, the lumber 6 is stacked edgewise with separating stickers and gravel 5 is then poured over the whole and allowed to fill the interstices. The buggy 4 is then with its load placed in the kiln and the kiln sealed by means of door 3, trap doors 25 being closed. Steam is admitted into the kiln through orifices 8, with blow-off valve 13 and drain valve 17 preferably open to allow the escape of air, and especially so if the pressure in the shell is later to be carried below atmospheric pressure. When the air has been practically displaced blow-off valve 13 is closed and drain valve 17 is closed except when it may be desired to remove fluids from the shell. Steam is allowed to continue to enter the shell until the desired pressure is reached.

The lumber and gravel or other heat absorbing material condense the steam coming in contact with them until they are brought to the same temperature as the steam, the process as to the lumber being hastened by the heat radiated and conducted through the lumber from the gravel or other heat absorbing material. The products of condensation are collected in the bottom of the shell from which any excess may be drawn off through drain valve 17, but enough should be left within the shell to insure complete saturation of the steam therein. The lumber being constantly in a saturated atmosphere no evaporation from the surface thereof takes place. After this process has continued long enough to secure a uniform temperature throughout the lumber, the gravel or other heat absorbing material, and the steam within the shell, the pressure is allowed to drop either by opening the blow-off valve 13, or by condensation through opening of the trap doors 25, producing a circulation of air between the shell 1 and the outer insulating protector 24; or by condensation caused by a flow of cold water through the pipes 2, or by other suitable means. The consequent drop in pressure is accompanied by a drop in the temperature of the steam remaining within the shell, but constant saturation is secured by the presence of the products of condensation in the shell, so that no large amount of evaporation takes place from the surface of the lumber. The interior of the lumber itself, however, cools more slowly than the surrounding steam and its cooling is still further retarded by the heat radiated from the gravel or other heat absorbing material. The fluids within the lumber are therefore at approximately the same temperature as before the pressure was reduced, that is at a temperature above the boiling point corresponding to the pressure to which they are now subjected. They therefore vaporize in sufficient quantity to take up this excess heat and the resulting internal pressure thus developed forces out a part of the remaining fluids within the lumber, together with any substances held in solution or suspension in such fluids. If the difference in temperature is too great too large an amount of vaporization is required to neutralize it, and the resulting internal pressure splits the lumber. The pressure must therefore be lowered slowly. This process continues until the consumption of heat by this process of internal vaporization has restored, as to any remaining liquid in the lumber, an equilibrium between temperature and pressure, and may therefore be continued by a constant lowering of the pressure of the steam within the shell, either by a process of suction or by condensation, until the lowest practicable absolute pressure has been obtained within the shell. If the lumber is not sufficiently dry, steam may be again turned on through orifices 8 and the process repeated. This process leaves the pores of the wood in an open and distended condition and if now all free liquids are withdrawn from the shell and the inlet valve 10, and the blow-off valve 13, and the drain valve 17 are closed, the radiation from the gravel will raise the temperature within the shell to such a point that the evaporation of any remaining liquids in the wood is secured, the products of such evaporation being withdrawn through an appropriate outlet. This process may be regulated so as to bring about certain changes in the lignone complex, and other bodies remaining in the lumber, with the effect of increasing its tensile strength and decreasing its tendency to absorb moisture. If the heat remaining in the gravel be insufficient for this purpose additional heat may be supplied. When the evaporation and other changes described above are completed the lumber is withdrawn from the shell and allowed to cool.

In utilizing this invention and process to extract the fluids contained in wood or other cellular, fibrous, or porous substances or developed therein during the process, or substances contained in solution or suspension in said fluids, or any volatilizable substances contained in such wood or other cellular, fibrous, or porous substances, the operation is substantially as outlined above except that the lumber buggy is replaced by a suitable carriage and that the gravel or other heat absorbing material is differently commingled with the cellular material.

Having thus described my process, what I claim and desire to secure by Letters Patent is:

1. The process of extracting fluids, substances contained in solution or suspension in such fluids, and fusible substances from cellular, fibrous, or porous substances, consisting of heating the same in an inclosed shell containing a saturated gaseous medium under a given pressure to the boiling point at the given pressure of the fluids or fusible substances which it is desired to remove from such cellular, fibrous, or porous substances, and thereafter lowering the pressure and temperature of the gaseous medium with sufficient rapidity to produce internal vaporization within such cellular, fibrous, or porous substances, said lowering being continued until sufficient internal vaporization has been produced to expel the fluids contained in such substances.

2. The process of extracting fluids, substances contained in solution or suspension in such fluids, and fusible substances from cellular, fibrous, or porous substances consisting of commingling such substances with substances which more readily absorb and radiate heat and then heating the commingled aggregate in an inclosed shell in a saturated gaseous medium under a given pressure to the boiling point at the given pressure of the fluids or fusible substances which it is desired to remove from such cellular, fibrous, or porous substances, and thereafter lowering the pressure and temperature of the gaseous medium with sufficient rapidity to produce internal vaporization within such cellular, fibrous, or porous substances, said lowering being continued until sufficient internal vaporization has been produced to expel the fluids contained in such substances.

3. The process of extracting fluids, substances contained in solution or suspension in such fluids, and fusible substances from cellular, fibrous, or porous substances consisting of heating the same in an inclosed shell in a saturated gaseous medium under a given pressure to the boiling point at the given pressure of the fluids or fusible substances which it is desired to remove from such cellular, fibrous, or porous substances, and thereafter lowering the pressure and temperature of the gaseous medium with sufficient rapidity to produce internal vaporization within such cellular, fibrous, or porous substances, said lowering being continued until sufficient internal vaporization has been produced to expel the fluids contained in such substances, and then subjecting such substances to the action of heat in a non-saturated gaseous medium.

4. The process of extracting fluids, substances contained in solution or suspension in such fluids, and fusible substances from cellular, fibrous, or porous substances consisting of commingling such substances with substances which more readily absorb and radiate heat and then heating the commingled aggregate in an inclosed shell in a saturated gaseous medium under a given pressure to the boiling point at the given pressure of the fluids or fusible substances which it is desired to remove from such cellular, fibrous, or porous substances, and thereafter lowering the pressure and temperature of the gaseous medium with sufficient rapidity to produce internal vaporization within such cellular, fibrous, or porous substances, until sufficient internal vaporization has been produced to expel the fluids contained in such substances, and then subjecting such substances to the action of heat in a non-saturated gaseous medium.

5. The process of drying or seasoning cellular, fibrous, or porous substances consisting of commingling the same with substances which more readily absorb and radiate heat, and then heating the commingled aggregate in an inclosed shell with saturated steam under a given pressure and temperature to the boiling point at the given pressure of the fluids contained in such cellular, fibrous, or porous substances and thereafter lowering the steam pressure, maintaining a saturated condition of the steam, with sufficient rapidity to produce internal vaporization within such cellular, fibrous, or porous substances, and repeating said process and continuing said lowering of pressure until sufficient internal vaporization has been produced to expel the fluids contained in such substances, removing the fluids so expelled and all products of condensation from the shell, and completing the drying process by keeping the steam within the shell in a non-saturated or superheated condition.

DANIEL B. BANKS.

Witnesses:
  CHAS. L. HUTCHINS,
  WILLIAM W. VARNEY.